United States Patent [19]

Johnson et al.

[11] 4,014,817

[45] Mar. 29, 1977

[54] MANUFACTURE OF ACTIVATED CARBON FROM SIZED COAL

[75] Inventors: Bruce C. Johnson, Grand Forks, N. Dak.; Rabindra Kumar Sinha, Coraopolis; John Emery Urbanic, Pittsburgh, both of Pa.

[73] Assignee: Calgon Corporation, Pittsburgh, Pa.

[22] Filed: Apr. 3, 1975

[21] Appl. No.: 564,929

[52] U.S. Cl. .............................. 252/445; 252/444; 252/421; 201/8
[51] Int. Cl.² .................. B01J 21/18; B01J 37/00; C10B 53/04
[58] Field of Search ................. 252/445, 444, 421; 423/445, 460; 201/8

[56] References Cited

UNITED STATES PATENTS

| | | | |
|---|---|---|---|
| 2,040,931 | 5/1936 | Fuchs | 252/421 |
| 2,894,914 | 7/1959 | Hassler et al. | 252/445 |
| 3,630,959 | 12/1971 | Kiikka | 252/445 X |
| 3,876,505 | 4/1975 | Stoneburner | 252/445 X |

*Primary Examiner*—Patrick P. Garvin
*Assistant Examiner*—William G. Wright
*Attorney, Agent, or Firm*—Harry E. Westlake, Jr.; Raymond M. Speer

[57] ABSTRACT

An improved method of manufacturing activated carbon from dried, bituminous, subbituminous, and lignite coal by sizing and simultaneously drying and oxidizing, and thereafter activating the sized coal, wherein the improvement comprises acid washing the coal prior to carrying out the said manufacturing method.

7 Claims, No Drawings

MANUFACTURE OF ACTIVATED CARBON FROM SIZED COAL

BACKGROUND OF THE INVENTION

In copending Application Ser. No. 313,463, filed Dec. 8, 1972, and now U.S. Pat. No. 3,876,505, which is incorporated herein by reference, there is disclosed a method (hereinafter referred to as the basic method of manufacture) of preparing activated carbon comparable to conventional granular activated carbon, but without the usual steps of pulverizing, mixing, briquetting and carbonizing.

The basic method, to which the improvement of the present invention is directed, requires first of all a proper choice of coal starting material. The method requires a low-grade coal, that is, a coal which is largely nonagglomerating, has high volatile matter, bed moisture greater than 10 percent by weight, an oxygen content greater than 10 percent by weight (other than that contributed by the moisture), and relatively low Btu content. Suitable coals are those ranked as High Volatile C Bituminous Coal, as Subbituminous A, B, and C, and as Lignite A and B Coal in "Classification of Coals by Rank", American Standards Association, ASTM-D388-64T (1964). The bed moisture of the coal employed should be from about 10 to about 25 percent by weight; and the oxygen content from about 10 to about 25 percent by weight, both on a dry, mineral-matter-free basis. The Btu value should be no greater than about 11,000 per pound, on a moist, mineral-matter-free basis. The coal starting material should be a mined, naturally occurring product which has not been treated or processed in such a way as to alter its inherent properties.

Once selected, the coal is then crushed and separated to a size in the range of 2 × 40 U.S. Sieve Series. The crushed and separated coal is then heated in air at a temperature of from about 150° C. to about 215° C. for a period of from 30 minutes to 18 hours, whereby from about 1 percent to about 3 percent by weight of oxygen is added to the coal. The thus oxidized coal is then activated at a temperature between 540° C. and 1,100° C. in a controlled oxygen atmosphere.

It has been found that the activated carbon preparation method just described is improved by acid washing of the coal starting materials prior to the step of oxidation by air heating.

Acid treatment of coal for various purposes is well known. For example, Aldrich et al. U.S. Pat. No. 3,816,826 discloses a method for extracting coal from deep mines with the aid of comminuting agents, included among which is glacial acetic acid. Urbanic et al. U.S. Pat. No. 3,778,387 discloses a method for preparing activated carbon with anti-oxidant properties prepared by washing activated carbon with a mineral acid prior to oxidizing. Acids have been used as activation agents. U.S. Pat. Nos. 1,438,113 and 2,437,174 describe the use of boric acid for this purpose, and Netherlands Pat. No. 79,398 describes the use of nitric acid for this purpose. U.S. Pat. No. 3,630,959 describes treatment of bituminous coal with concentrated sulfuric acid, which permits carbonization of the coal at an accelerated rate without caking during heating at 400°–600° C. The product is then steam activated. Russian Pat. No. 233,633 discloses preparation of granular activated carbon by activating a mixture of coal dust and binder with steam, followed by treatment of the product with a hydrochloric acid solution. Acids have been employed to remove the ash (mineral) content of coals. Wortz U.S. Pat. No. 2,036,380 discloses a method of preparing an ash-free activated carbon by maintaining a solution comprising essentially sucrose in concentrated hydrochloric acid at a moderate temperature to form a hard carbon mass which is then ignited to decompose residual organic compounds. Finally, Kitagawa in Kogyo Kagaku Zasshi, 74(10), 1981–6 and 74(7), 1383–6 (1971), discloses treatment of chars with dilute hydrochloric acid in order to obtain active carbons with larger specific surface areas when subsequently steam activated.

SUMMARY OF THE INVENTION

The present invention is directed to an improvement in a method of manufacturing activated carbon from dried bituminous, subbituminous, and lignite coals which comprises a preliminary step of acid washing the coal starting materials, prior to the subsequent steps of drying, oxidizing and activating the coal.

The improvement achieved by the method of the present invention comprises enhanced production of smaller pore adsorption areas during activation in the basic method of manufacture, as evidenced by significant increases in the Iodine ($I_2$) and Carbontetrachloride ($CCl_4$) Numbers of the activated carbon final product.

The improvement achieved by the method of the present invention is, thus, measured chiefly in terms of the Iodine ($I_2$) Number and Carbontetrachloride ($CCl_4$) Number of the activated carbon final product. Generally, the improved activated carbon will have significantly higher iodine and Carbontetrachloride Numbers and will also have somewhat lower Molasses Numbers. Particularly, the desired activated carbon will preferably have an Iodine Number of 750 or greater, a Carbontetrachloride Number of 40.0 or greater, and a Molasses Number of 200–300. More particularly, the desired activated carbon will most preferably have an Iodine Number of 900 or greater, a Carbontetrachloride Number of 50.0 or greater, and a Molasses Number of 200–300. However, the present invention is applicable to significant improvements in these characteristic numbers, even though they remain, after acid treatment, below the particularly preferred values set out immediately above.

The present invention is applicable to all types of coals which are suitable starting materials for the basic method of manufacture, but is particularly of benefit where the specific coal starting material is not found to be activatable by the basic method of manufacture so as to possess the preferred activated carbon characteristics detailed above.

The present invention is also particularly applicable to the problem of "weathering". It has been found that often suitable subbituminous coal starting materials which have been exposed to the atmosphere for a sufficient amount of time will fail to yield activated carbon materials having the characteristics usually obtained from subbituminous coal not similarly exposed, when prepared by the basic method of manufacture described above. The conclusion that weathering, that is, exposure to the atmosphere, especially water, is responsible for the unsatisfactory activation results is based in part on the discovery that similar coal samples protected from weathering by storage in closed steel drums give the preferred characteristics discussed above, when activated in accordance with the procedures of the basic manufacturing process. However, acid washing of suitable coal starting materials for use in the basic method of manufacture may improve the characteristics of the activated carbon materials obtained, independent of weathering, or lack of it, of the coal. For example, it has been found that coal starting materials having five percent by weight or more of calcium oxides and two percent by weight or more of magnesium oxides will not ordinarily be activatable to the preferred characteristics for the activated carbon product of the basic method of manufacture. However, acid treatment in accordance with the present invention will significantly improve the desired activation product characteristics and will usually enable such coal starting materials to become activated to the said preferred characteristics. It is thought that the problem of weathering and that of the presence of undersirable, interfering compounds such as calcium oxides and magnesium oxides may be part of the same phenomenon, in that water penetrating the coal during weathering may move such undesirable, interfering compounds by leaching, to positions in the coal structure where the opportunity for, or results of, interference are increased. The method of the present invention is thus an improvement applicable to all bituminous, subbituminous, and lignite coal starting materials for the basic method of manufacture, whose activation product characteristics, as discussed above, are thereby improved.

It is inferred from the results obtained that the acid treatment of the coal starting material slows down the activation rate and allows the coal sample being activated to develop a larger capacity for iodine and carbontetrachloride adsorption. It would appear that the mechanism for this increased capacity is related to an increased activation of the inner pores accompanied by reduced surface oxidation. This result is evidenced by the fact that the Molasses Numbers of acid treated coal samples are somewhat lower than the Molasses Numbers of untreated coal samples, when both are activated under the same conditions and to the same weight loss. While it is theorized that acid treatment of the coal starting material may remove compounds which would catalyze or promote rapid oxidation during activation, or that the acid treatment may add or replace acid groups normally expected to slow the rate of activation, there is no intention to limit the present invention by such theories.

The acid treatment of the coal is most efficiently accomplished in conjunction with the initial step of crushing the coal starting material in the basic method of manufacture. Thus, the crushed coal would be treated by contacting it with a dilute solution of an acid.

However, the invention is broadly applicable to acid treatment of the coal starting material prior to the step of oxidation by air heating. Thus, the acid treatment may take place before, during, or after the step of crushing and separating the coal starting material.

Useful acids for this treatment are the mineral acids, for example, Hydrochloric acid, nitric acid and sulfuric acid, among others. The preferred mineral acid is hydrochloric acid. The concentration of the acid is not considered critical and concentrations as low as 1.0 percent by weight or less may be used. However, dilute concentrations of acid, of from about 1.0 to about 20.0 percent by weight, have been preferred, and a 10.0 percent by weight concentration of hydrochloric acid has been particularly preferred. The total amount of acid solution employed compared to the amount of coal being treated is preferably at least in a ratio of 1:1 on a volume to volume basis, generally in a ratio of from about 1:1 to about 2:1. Greater and smaller ratios of amounts may be employed, but with diminishing effectiveness.

The acid treatment or washing of the coal starting material may be accomplished in a number of ways. For example a solution of the mineral acid may be pumped through a bed of coal for a period of from 1 hour to 24 hours or more. The solution may be heated, up to the boiling temperature of the acid solution, to increase the rate of effectiveness of the treatment. It has been found that the period of time for which the coal starting material is retained, that is, exposed during the acid treatment, is preferably at least one-half hour at elevated temperatures, and at least 24 hours or more at normal room temperatures. Such parameters as time, temperature and concentration of acid are all interdependent, and depend in turn on the type and composition of the coal starting material. Since crushing of the coal tends to greatly increase the surface area of contact between the coal and the acid treatment solution, and since crushing of the coal is the initial step in the basic method of manufacture, the acid treatment and crushing steps will ordinarily be combined, or at least crushing of the coal starting material will precede the acid treatment.

After the acid treatment of the coal starting material is completed, the acid is removed from the coal, for example by thoroughly rinsing the coal with water, before proceeding to drying and the succeeding steps of the basic method of manufacturing the activated carbon. The acid is removed from the treated coal starting material primarily for the purpose of preventing corrosive attack by the acid on the equipment employed in the oxidation and activation steps of the basic method of manufacture.

The crushed coal particles, which have been sized to particle sizes in the range of from No. 2 to No. 40 U.S. Sieve Series, are placed in a dryer to remove essentially all of the moisture present, allowing a maximum of about one percent by weight to remain. During the drying process from about one to about three percent by weight of oxygen is added to the coal. This addition of oxygen to the coal is a critical step in enhancing the activateability of the coal. The temperature during the drying and oxidizing treatment should be from about 150° C. to about 215° C. for a period of from 18 hours in a static condition to about 30 minutes with the coal particles in a fluid condition. The drying and oxidation step renders the coal particles activatable. These steps may be accomplished separately. Oxidation may be accomplished by the use of oxygen-enriched air, that is, to the extent of 50 percent or more.

The coal particles thus dryed and oxidized as described above are then activated by conventional processes. These activation processes will normally involve high-temperature operation between about 540° to 1,100° C. and will be carried out in means suitable for exposing the particles to a controlled oxygen activation atmosphere such as steam, carbon dioxide, air or the like, for a period of thirty minutes to ten hours or more, depending on the degree of activation desired. Chemical agents such as zinc chloride, phosphoric acid, sulfuric acid and others may also be used for activation at temperatures between 600° and 1000° C. The method of activation is not critical to the operation of the basic method of manufacturing the activated carbon.

EXAMPLE 1

Coal samples which had been protected from weathering and samples which has been exposed to the atmosphere were subjected to repeated boiling water treatments to determine pH and to remove soluble compounds. The water extracted from the test samples was analyzed for pH and for magnesium, calcium and chloride content. The results of the analyses are illustrated in the following table of values:

| | Water Extracted Compounds and pH of Weathered and Protected Coal Compared | | | | |
|---|---|---|---|---|---|
| | pH | | ppm First Extraction | | |
| Sample | First Extraction | Sixth Extraction | Magnesium | Calcium | Chloride |
| Exposed | 5.73 | 6.38 | 30 | 70 | 10 |
| Protected | 3.81 | — | 14 | 50 | 15 |

EXAMPLE 2

An additional sample of the coal protected from weathering described in Example 1 above was activated in accordance with the basic method of manufacture. The activated carbon final product was evaluated for desired characteristics and these are summarized in the following table of values:

| Characteristics of Activated Carbon from Protected Coal Starting Material | | | | | |
|---|---|---|---|---|---|
| Sample | $I_2$ | Mol | $CCl_4$ | A.D.[1] (g/ml) | Ash (% by wt.) |
| Activated Carbon of Exp. 2 | 852 | 212 | 46.8 | 0.426 | 7.66 |

[1]A.D. = apparent density, and is the weight of a unit volume of activated carbon, including the pores and the voids between the particles.

EXAMPLE 3

Two samples of coal, designated A and B, which had been allowed to weather were crushed and sized to 8 × 30 U.S. Sieve Series. The sized particles were found to have an apparent density of 0.753. The coal particles were then subjected to drying and oxidation in a fluidized bed apparatus for 60 minutes, at temperatures ranging between 165° and 205° C., and with an air flow rate of 1.5 cubic feet/minute. The apparent density of the dried coal particles was 0.707. The coal particles were then activated with steam and nitrogen at flow rates of 2.5 ml/min. (as water) and 1.0 l/min., respectively. The activation temperatures are indicated in the table of values below, as are the characteristics of the activated carbon final product.

| Characteristics of Activated Carbon from Weathered Coal Starting Material | | | | | | |
|---|---|---|---|---|---|---|
| Sample | Activation Temp. °C. | $I_2$ | Mol. | $CCl_4$ | A.D. (g/ml) | Ash (% by wt.) |
| A | 860–905 | 658 | 292 | 34.4 | 0.474 | 7.35 |
| B | 760–860 | 615 | 315 | 36.2 | 0.477 | 8.57 |

Comparison of the data from the table immediately above with that from the table of Example 2 above, clearly shows the lower iodine and carbontetrachloride numbers and higher molasses numbers characteristic of the activated carbon products obtained from weathered coal starting materials, compared to the said numbers characteristic of the activated carbon products obtained from coal starting materials protected from weathering.

EXAMPLE 4

An attempt was made to improve the activated carbon characteristics of products obtained from coal starting materials exposed to weathering by water extraction of the coal starting materials. To a 100 gram sample of the coal was added 150 ml. of distilled water and the mixture was then heated under medium heat for 20 minutes. The solution was decanted and filtered by vacuum filtration. This water extraction procedure was repeated five more times. The coal was then dried, oxidized and activated by the basic method of manufacture as described in Example 3 above, at an activation temperature of 860°–905– C. The characteristics of the activated carbon final product are illustrated in the table of values below.

| Characteristics of Activated Carbon from Water Extracted Coal Starting Material | | | | |
|---|---|---|---|---|
| $I_2$ | Mol. | $CCl_4$ | A.D. (g/ml) | Ash (% by wt.) |
| 655 | 299 | 30.0 | 0.506 | 8.12 |

It is clear from the data in the table immediately above that the repeated water extraction of the coal starting material did not alter the characteristics of the activated carbon final product obtained from weathered coal starting material.

EXAMPLE 5

A 100 gram sample of weathered coal starting material (the same coal starting material as in Example 3 above) was acid washed by admixing it with 150 ml. of a 10% solution of hydrochloric acid. The admixture was heated moderately for 20 minutes, after which the solution was decanted. The coal sample was then washed with water by admixing the sample with 150 ml. of distilled water and heating moderately for 20 minutes, following by decanting and filtration. This water washing procedure was repeated a total of five times. The coal sample was then dried and oxidized for 18 hours at 150° C., after which it was activated at 860°–905° C. for 87 minutes. The characteristics of the activated carbon final product are illustrated in the table of values below.

| Characteristics of Activated Carbon from Acid Treated Coal Starting Material | | | | |
|---|---|---|---|---|
| $I_2$ | Mol | $CCl_4$ | A.D. (g/ml) | Ash (% by wt.) (g/ml) |
| 902 | 216 | 48.4 | 0.513 | 6.41 |

The values in the table immediately above establish that the acid treatment of the coal starting material gave an activated carbon final product having the preferred characteristics, similar to those of activated carbon produced from coal protected from weathering, set out in Example 2 above.

EXAMPLE 6

A 100 gram sample of weathered coal starting material was acid treated in accordance with the procedures of Example 5 above, except that the coal sample was heated in the acid solution for a period of 35 minutes, instead of 20 minutes. The characteristics of the activated carbon final product are illustrated in the table of values below.

| Characteristics of Activated Carbon from Acid Treated Coal Starting Material | | | | |
|---|---|---|---|---|
| $I_2$ | Mol | $CCl_4$ | A.D. (g/ml) | Ash (% by wt.) |
| 1031 | 232 | 55.4 | 0.472 | 7.07 |

EXAMPLE 7

A 6 × 20 U.S. Sieve Series sample of raw coal containing higher quantities of calcium and magnesium salts, but which had not been exposed to weathering, was dried and oxidized for 210 minutes with a programmed temperature rise to 350° C. An air atmosphere flow rate of 2500 ml/min. was maintained during the first 100 minutes, and was then reduced to 925 ml/min. for the remainder of the period. Activation took place at 955° C. in an atmosphere of 78% steam and 22% nitrogen for a period of 32 minutes. The characteristics of the activated carbon final product are illustrated in the table of values below.

| Characteristics of Activated Carbon from Coal Containing Higher Amounts of Catalyzing Salts | | | | |
|---|---|---|---|---|
| $I_2$ | Mol | $CCl_4$ | A.D. (g/ml) | Ash (% by wt.) |
| 694 | 294 | 33.0 | 0.369 | 10.46 |

The data in the above table is characteristic of a coal starting material which has not given the preferred characteristics in the activated carbon final product.

EXAMPLE 8

A 100 g. sample of the coal starting material employed in Example 7 above was acid washed. The sample was added to 150 ml. of a 10% solution of hydrochloric acid, and the mixture was then heated at boiling for 30 minutes. The solution was decanted, and the coal was then rinsed with distilled water by boiling therein for 5 minutes. This procedure was repeated a total of five times. The coal sample was dried for 24 hours at 105° C. The dried coal sample was then oxidized in a forced air drier at 150° C. for 16 hours. The coal sample was next activated at 955° C. in an atmosphere of 78% steam and 22% nitrogen for a period of 52 minutes. The characteristics of the activated carbon final product are illustrated in the table of values below.

| Characteristics of Activated Carbon from Acid Treated Coal Starting Material | | | | |
|---|---|---|---|---|
| $I_2$ | Mol | $CCl_4$ | A.D. (g/ml) | Ash (% by wt.) |
| 870 | 259 | 43.4 | 0.424 | 6.38 |

The data from the table immediately above illustrates the effectiveness of acid treatment in obtaining activated carbon having the preferred characteristics from coal starting material containing higher quantities of catalyzing salts.

EXAMPLE 9

A series of samples (A–D) were obtained from two different pits of the same coal mine. Each of the samples was carried through the steps of the basic method of manufacture, each sample both with and without acid treatment. The acid treatment consisted of washing the coal sample, which had been crushed and sized to 6 × 20 mesh size, U.S. Sieve Series, with 1.2 volumes of 10% HCl solution, and boiling of the coal and acid solution slurry for 30 minutes. The acid solution was then decanted from the coal and 1.2 volumes of water were in turn added to the coal, stirred, and decanted. The rinse procedure was repeated five times. The oxidation step of the basic method was accomplished by heating the samples at 150° C. in a forced air furnace for 16 hours. The activation was carried out at 955° C. in an atmosphere of 78% steam and 22% nitrogen. The results of these procedures, clearly showing the improved activation characteristics obtained with acid treatment, are illustrated in the table of values below.

| Affect of Acid Treatment on Activation Characteristics | | | | | | | | |
|---|---|---|---|---|---|---|---|---|
| | Sample | | | | | | | |
| Activation Characteristics | A | | B | | C | | D | |
| | 1* | 2* | 1 | 2 | 1 | 2 | 1 | 2 |
| $I_2$ | 594 | 817 | 657 | 838 | 694 | 980 | 812 | 996 |
| Mol. | 253 | 233 | 261 | 229 | 251 | 241 | 340 | 254 |
| $CCl_4$ | 24.9 | 39.6 | 30.0 | 40.4 | 29.0 | 45.6 | 39.3 | 53.0 |
| Apparent Density | | | | | | | | |

-continued

Affect of Acid Treatment on Activation Characteristics

| Activation Characteristics | Sample | | | | | | | |
| --- | --- | --- | --- | --- | --- | --- | --- | --- |
| | A | | B | | C | | D | |
| | 1* | 2* | 1 | 2 | 1 | 2 | 1 | 2 |
| (g/ml) | 0.51 | 0.43 | 0.50 | 0.45 | 0.47 | 0.46 | 0.44 | 0.45 |

*1: not acid treated
2: acid treated

What we claim is:

1. An improved method of making granular activated carbon comprising (a) crushing and separating to a size in the range of 2 × 40 U.S. Sieve Series, a coal having an ASTM rank of High Volatile C Bituminous, Subbituminous and Lignite, and having greater than 10 percent by weight bed moisture and greater than 10 percent by weight oxygen content; (b) heating said crushed and separated coal in air at a temperature of from about 150° C. to about 215° C. for a period of from 30 minutes to 18 hours, whereby from about 1 percent to about 3 percent by weight of oxygen is added to the coal; and (c) activating the thus oxidized coal at a temperature between about 540° and 1,100° C. in a controlled oxygen atmosphere;
wherein the improvement comprises the step of contacting the coal starting material with a mineral acid in amount and for a time sufficient to result in an activated carbon produced by the remaining steps which has significantly higher Iodine and Carbontetrachloride Numbers, followed by the step of removing said acid from said coal, said steps being carried out prior to heating said coal in air.

2. The method of claim 1 wherein the step of treating the coal with mineral acid takes place prior to the step of crushing and separating.

3. The method of claim 1 wherein the step of treating the coal with mineral acid takes place at the same time as the step of crushing and separating.

4. The method of claim 1 wherein the step of treating the coal with mineral acid takes place after the step of crushing and separating.

5. The method of claim 1 wherein the mineral acid is hydrochloric acid.

6. The method of claim 5 wherein the concentration of the hydrochloric acid is from about 1.0 to about 20.0 percent by weight.

7. A granular activated carbon produced by the process of claim 1.

* * * * *